United States Patent

Lyons

[11] Patent Number: 5,903,574
[45] Date of Patent: May 11, 1999

[54] STUDIO TRANSMITTER LINK METHOD AND APPARATUS

[75] Inventor: Paul Wallace Lyons, New Egypt, N.J.

[73] Assignee: Sarnoff Corporation, Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/839,929

[22] Filed: Apr. 18, 1997

[51] Int. Cl.$^6$ .............................. G06F 11/00; G06F 7/02
[52] U.S. Cl. ...................... 371/5.1; 371/37.01; 371/68.2; 395/185.09
[58] Field of Search ........................... 371/5.1, 5.5, 20.1, 371/20.2, 30, 35, 37.01, 37.2, 41, 43.1, 45, 67.1, 68.1; 395/185.09, 183.19; 364/265.1, 268.7, 269.2, 299.2, 944.2, 944.5; 348/180, 192, 193, 465, 466

[56] References Cited

U.S. PATENT DOCUMENTS

| | | | |
|---|---|---|---|
| 4,442,521 | 4/1984 | Inaba et al. | 371/68.2 |
| 4,995,042 | 2/1991 | Guthaus et al. | 371/68.2 |
| 5,369,641 | 11/1994 | Dodt et al. | 371/2.2 |
| 5,544,179 | 8/1996 | Hartwell | 371/47.1 |
| 5,669,365 | 9/1997 | Klayman et al. | 371/5.5 |

*Primary Examiner*—Trinh L. Tu
*Attorney, Agent, or Firm*—William J. Burke

[57] ABSTRACT

A studio to transmitter link (STL) that comprises a relatively low error rate communication channel implements error correction techniques at the studio side which are designed to reduce errors in the combined low error rate STL channel and a relatively high error rate communication channel used by the transmitter.

22 Claims, 3 Drawing Sheets

STUDIO TRANSMITTER LINK METHOD AND APPARATUS

This invention was made with U.S. government support under contract number 70NANB5H1174. The U.S. government has certain rights in this invention.

The invention relates to communication systems in general, and more particularly, the invention relates to a method and apparatus for delivering packetized information to a transmitter.

BACKGROUND OF THE DISCLOSURE

Electromagnetic transmission facilities (e.g., television, radio, cellular telephone, and the like) are often situated in geographically remote locations due to various technical and political reasons. As such, the source (e.g., a studio or control center) of a signal or signals to be transmitted may be many miles away from the transmission facility. A studio to transmitter link (STL) is used to deliver signals from the source to the transmission facility.

The STL may be implemented using, e.g., microwave, optical fiber, subscriber networks or other technologies depending upon, e.g., the type of signals being delivered via the STL and the amount of information contained in those signals. The technology employed by the STL may use some type of error correction to help correct errors which may occur. In multilayered STL systems, where several communication technology systems are used, multiple error correction schemes may be employed. In addition, the STL may be implemented using redundant channels to protect against a catastrophic failure of a single channel. However, the use of multilayered systems or redundant channels increases the cost and complexity of the STL.

A new television standard, the Advanced Television Systems Committee (ATSC) Digital Television Standard (ATSC A/53 Specification), has been proposed, tested and recommended for use in the United States. This standard is a constrained subset of the ISO/IEC International Standards 13818-1 specification for "Generic Coding of Moving Pictures and Associated Audio" and is generally referred to as ATSC A/53. Television studios producing signals in compliance with this new standard must be able to deliver the signals to appropriate transmission facilities for subsequent broadcast. Such signals will make substantial bandwidth or bitrate demands on an STL, possibly driving up STL costs and complexity.

Therefore, a need exists in the art for an STL method and apparatus having a reduced level of cost and complexity.

SUMMARY OF THE INVENTION

The disadvantages heretofore associated with the prior art are overcome by the present invention of a studio to transmitter link (STL) that comprises a relatively low error rate communication channel. The STL delivers a signal from a studio to a transmitter for subsequent transmission over a relatively high error rate communication channel. The STL implements error correction techniques at the studio side which are designed to reduce errors in the high error communication channel and may be used to reduce errors from both the STL and the communication channel in the final receiver. The STL optionally uses error correction codes to correct errors occurring in the low error communication channel or to analyze the performance of the low error channel. In the case of an STL comprising redundant communication channels, the STL may use the error correction codes to analyze each of the redundant channels and select the most error-free channel. The STL optionally utilizes error correction techniques which facilitate the recovery of information contained in the signal to be transmitted.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any communications system in which two or more communication channels are used in succession to deliver signals from a source to a receiver.

The invention will be described within the context of a television system in which a studio signal is coupled to a terrestrial broadcast transmitter via, illustratively, a relatively low error microwave link. By contrast, the terrestrial broadcast environment is very harsh and, therefore, more likely to produce error in the transmitted signal. The disclosed television system processes information in compliance with the ATSC A/53 specification. However, it must be understood that such processing is not necessary to practice the invention. Moreover, the term studio is not to be construed as simply a television studio, but rather as any signal source providing a signal for subsequent transmission.

Figure 1:
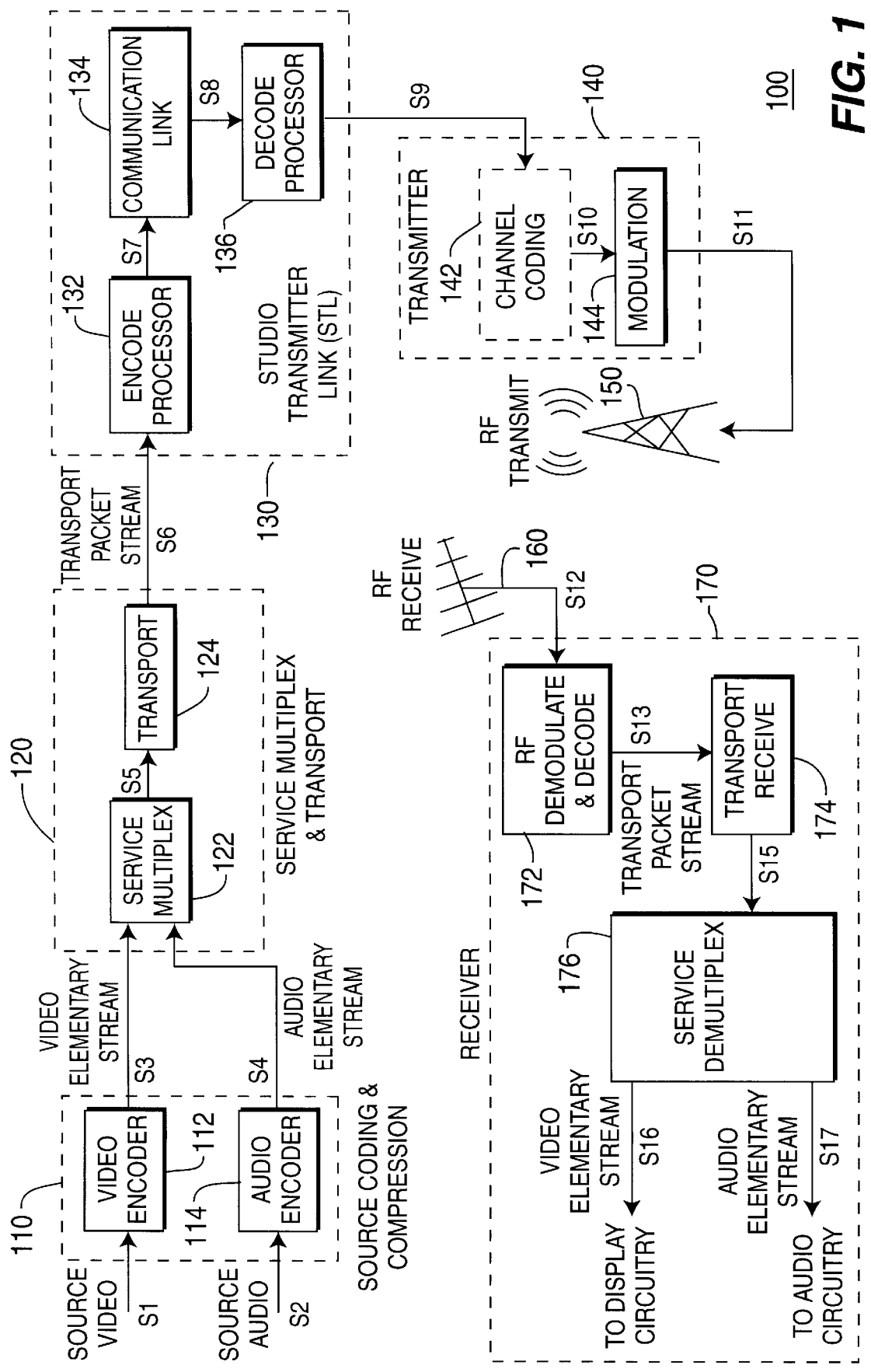
FIG. 1 shows a block diagram of a digital television system including the invention.

The television system 100 of FIG. 1 includes a studio portion 110, 120, a studio to transmitter link (STL) portion 130, a transmitter portion 140, 150 and a receiver portion 160, 170. The studio portion receives video S1 and audio S2 signals and converts these signals into an ATSC A/53 compliant transport stream S6. The STL portion encodes the transport stream S6, couples the encoded stream S7 over a relatively low error communication channel 134 (e.g., microwave, telecommunications or fiber optic links) and decodes the transmitted stream S8 as necessary to produce an error corrected STL output signal S9 or, in the preferred approach, a non-error corrected STL output signal S9. The transmitter portion 140, 150 channel codes the STL output signal S9 as necessary, modulates the channel coded signal S10 onto an RF carrier and transmits the modulated signal S11 via a terrestrial broadcast antenna 150. The receiver portion 160, 170 receives and demodulates the RF signal and retrieves the video and audio information.

The studio portion 110, 120 of television system 100 receives video S1 and audio S2 signals and converts these signals into an ATSC A/53 compliant transport stream S6. The studio portion of the television system comprises a source coding and compression (SCC) unit 110 and a service multiplex and transport (SMT) unit 120.

The source coding and compression (SCC) unit 110 comprises a video encoder 112 and an audio encoder 114.

The video encoder 112 receives an analog video source signal S1 and converts the analog video source signal S1 into a digital video data stream using known analog to digital converter (ADC) techniques. The digital video data stream is then compressed using known compression and bit rate reduction techniques to form a video elementary stream S3. Similarly, the audio encoder 114 receives, digitizes and compresses an analog audio source signal to form an audio elementary stream S4.

The service multiplex and transport (SMT) unit 120 comprises a service multiplexer 122 and a transport packetizer 124. The service multiplexer wraps the video S3 and audio S4 elementary streams into respective variable-length or fixed length packet structures known as packetized elementary streams (PES). The PES structure provides functionality for identification and synchronization of decoding and presentation of the video and audio information. The video PES is combined with the audio PES to form a multiplexed PES S5. The transport packetizer 124 converts the PES packets into fixed-length transport packets. The stream S6 of fixed length packets is then coupled to the STL.

The studio to transmitter link (STL) portion 130 of television system 100 encodes the transport stream S6, couples the encoded stream S7 over a relatively low error communication channel 134 (e.g., microwave, telecommunication or fiber optic links) and optionally decodes the transmitted stream S8 as necessary to produce an error corrected STL output signal S9 or, optionally, to pass the stream without error correction. Error detection and correction is performed in the receiver end of, e.g., a terrestrial receiver. Encode processor 132 processes the incoming data stream S6 by randomizing the incoming transport packets (except for packet sync bytes) and processing the randomized packets using forward error correction (FEC) in the form of Reed-Solomon (RS) coding (20 RS parity bytes are added to each packet), as per ATSC A/53 specification.

The encoded data stream S7 is coupled to a relatively low-error communication channel 134 such as a microwave link or a fiber optic link for delivery to a decode processor 136. The decode processor 136 receives and processes the delivered data stream S8 and passes the processed or unprocessed data stream S9 to the transmitter.

The additional information added to the transport packets may be used by receiver 170 to reconstruct the data from the received signal which, due to transmission impairments, may not accurately represent the transmitted signal. The additional information may also be used by the decode processor 136. The STL 130 will be explained in more detail below with respect to FIG. 2.

The transmitter portion 140, 150 of television system 100 channel codes the STL output signal S9, modulates the channel coded signal S10 onto an RF carrier and transmits the modulated signal S11 via a terrestrial broadcast antenna 150. A channel coder 142 receives the output data stream S9 from the STL and, in accordance with the ATSC A/53 specification, encodes the data using ⅙ interleaving and ⅔ rate trellis coding. The data is then organized as a series of data frames, each frame consisting of two fields, each field consisting of 313 segments, each segment consisting of 832 symbols. It should be noted that the actual data contained in a data segment comes from several transport packets.

Modulation unit 144 modulates the channel coded output data stream S10 onto an appropriate radio frequency (RF) carrier frequency (i.e., a selected NTSC 6 MHz channel) to produce a modulated RF output signal S11. RF output signal S11 is transmitted via terrestrial broadcast using antenna 150. The transmitter will be described in more detail below with respect to FIG. 3.

The receiver portion 160, 170 of television system 100 receives an RF signal S12 via antenna 160. RF demodulate and decode unit 172 includes the necessary tuner and carrier recovery circuitry (not shown) for demodulating the NTSC channel corresponding to S11. RF demodulate and decode unit 172 also includes the necessary symbol recovery circuitry, trellis decoder, data de-interleaver, Reed-Solomon decoder and data de-randomizer (not shown) for producing a reconstructed transport stream S13.

A transport receiver 174 converts the fixed-length transport packets into variable-length PES packets to produce a multiplexed PES S15. The multiplexed PES S15 includes video, audio and other information.

A service demultiplexer 176 demultiplexes PES S15 to produce at least a video elementary stream S16 and an audio elementary stream S17. The video S16 and audio S17 elementary streams are coupled to, respectively, display circuitry and audio circuitry (not shown) within the receiver 170.

Figure 2:
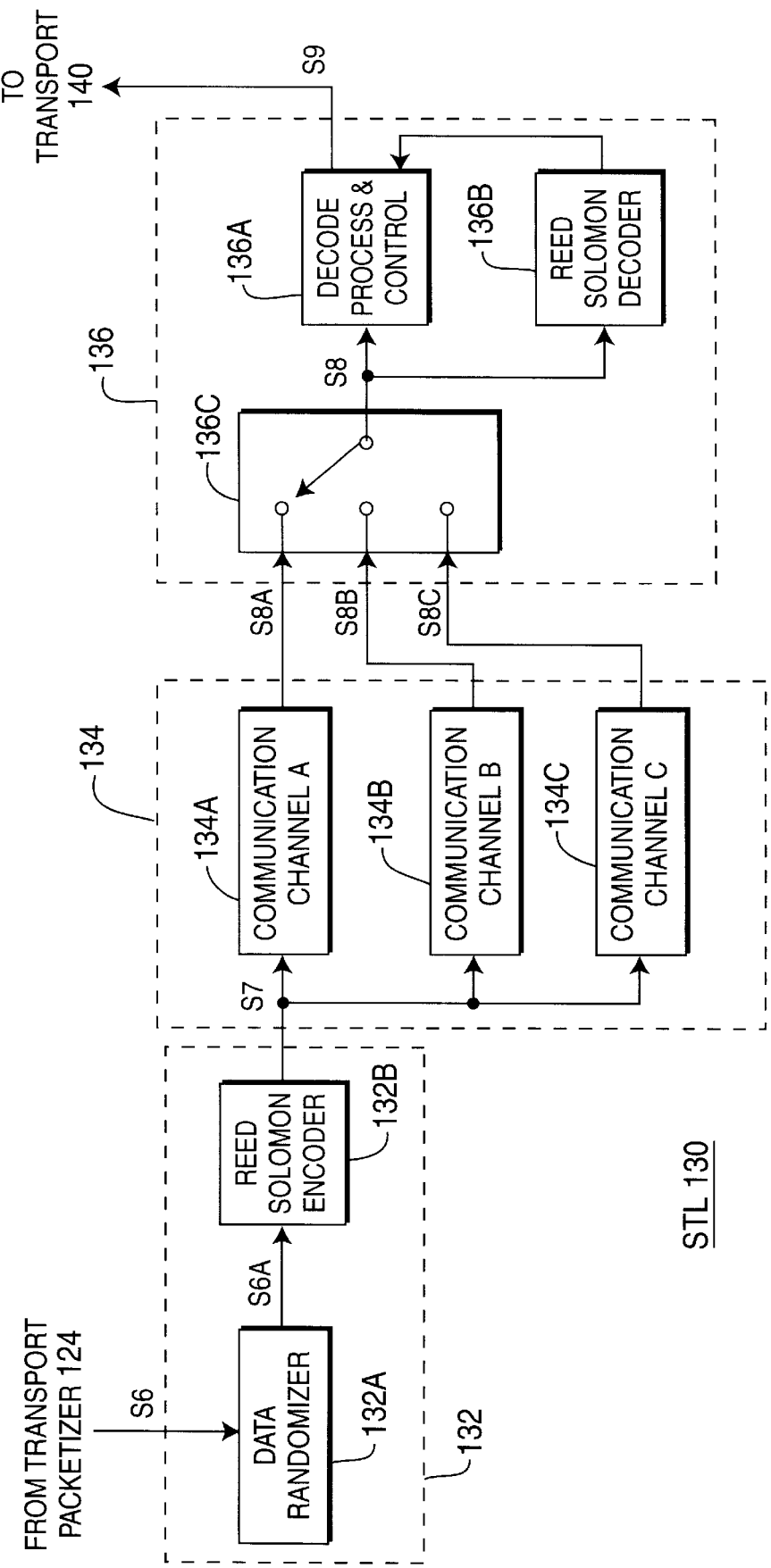
FIG. 2 shows a block diagram of a studio to transmitter link (STL) according to the invention and suitable for use in the television system of FIG. 1.

FIG. 2 depicts a block diagram of a studio to transmitter link (STL) according to the invention. As previously mentioned with respect to FIG. 1, data randomizer 132A is used to randomize the data payload of the transport packets of transport packet stream S6. In an ATSC A/53 system the incoming transport bit stream is comprised of 188-byte data packets (one sync byte and 187 data or payload bytes). The data randomizer 132A performs an exclusive-OR (XOR) function on all the incoming data bytes with, e.g., a 16-bit maximum length pseudo random binary sequence (PRBS) which is initialized at the beginning of the data field. This PRBS may be generated in a 16-bit shift register having nine feedback taps. Eight of the shift register outputs are selected as the fixed randomizing byte, where each bit from this byte is used to individually XOR the corresponding input data bit. Thus, the randomization process produces a data stream S6A in which data packets comprise one non-randomized sync byte and 187 randomized data bytes.

Randomization of the data at the studio (i.e., send) end of the STL facilitates clock recovery from the bitstream at the transmitter (i.e., receive) end of the STL. This is because the randomization process tends to increase the frequency of zero crossings in the data stream, thus allowing more opportunity for detection of edge transitions. Moreover, since each bit of the data byte is randomized, the byte is easily recovered regardless of the data contained therein (e.g., all zeroes or all ones) since the randomization process ensures multiple edge transitions within strings of constant value data bytes.

Reed-Solomon (RS) encoder 132B provides forward error correction (FEC) in the form of Reed-Solomon (RS) coding to the randomized data stream S6A. RS encoder 132A calculates 20 RS parity bytes for each packet and adds the RS parity bytes to each packet to produce encoded output stream S7 having 208 byte packets (one sync byte, 187 randomized data bytes and 20 RS parity bytes).

Encode processor 132 ideally builds the encoded output stream S7 using transport packets which contain the exact data required by the transmitter for generating field sync segments. In this manner, the transmitter 140 can easily synchronize on these packets. In the prior art, this function was required to be performed at a transmitter.

The encoded data stream S7 is coupled to communication channel 134. The communication channel 134 receives the encoded data stream S7, applies any channel-specific coding to the data stream, delivers the data stream and decodes the delivered data stream as necessary to produce delivered data stream S8. It is important to note that the communication channel need not include any error correction, since the encoded data stream S7 already includes, e.g., Reed-Solomon error correction codes. It is only necessary to adapt the packets to the size requirements of the channel. For example, if an asynchronous transfer mode (ATM) channel is used then each of the 208 byte transport packets of encoded data stream S7 will need to be incorporated into, e.g., five 53-byte ATM packets via a cell aligned packet mapping technique. Obviously, an inverse cell alignment packet mapping procedure will need to be performed upon the delivered ATM packets. These techniques are more fully described in the ATSC A/53 specification and related documents.

The communication channel 134 may include one or more channels 134A, 134B, 134C. For example, the three channels may comprise microwave links, fiber optic networks, common carrier networks or any other relatively low-error network or combination of networks in series or parallel. If different networks are used, especially networks subject to delays and burst-mode transmissions (such as ATM), it may be necessary to include buffering circuitry in the decode processor 136.

Decode processor 136 receives the delivered data stream S8 or streams S8A, S8B, S8C. In an STL having multiple communication channels, an optional channel selector 136C is used to selectively apply the received signal S8 to decode process and control (DPC) unit 136A. Additionally, the selected received signal may be applied to optional Reed-Solomon Decoder (RSD) unit 136B.

Decode process and control (DPC) unit 136A performs any desired error correction or timing function on the received signal and couples the received signal S8 to transmitter 140. For example, DPC unit 136A may be made responsive to RSD unit 136B to correct transmission errors occurring in the received signal if the RSD unit 136B indicates that the error count has exceeded an error threshold level. In the television system 100 of FIG. 1, the receiver 170 included error correction circuitry which will be able to correct a predetermined number of errors. Thus, the threshold level for the error correction decision in DPC unit 136A may be roughly calculated by starting with the predetermined number of errors correctable by the receiver and subtracting the number of errors indicated by RSD unit 136B, any anticipated number of errors likely to occur in transmission and any error margin.

Decode processor 136 may be used to characterize the quality of communication link 134 by examining the error rate of a channel over some period of time. Similarly, different communication channels may be compared on a qualitative basis. Such comparisons are especially useful in STLs having redundant communication channels, such as depicted in FIG. 2. Using a qualitative comparison, a "best" channel may be selected for transmission. Where there are three channels, two of which agree in terms of errors, a "worst" channel may determined to be the channel which does not agree with the other two.

Figure 3:
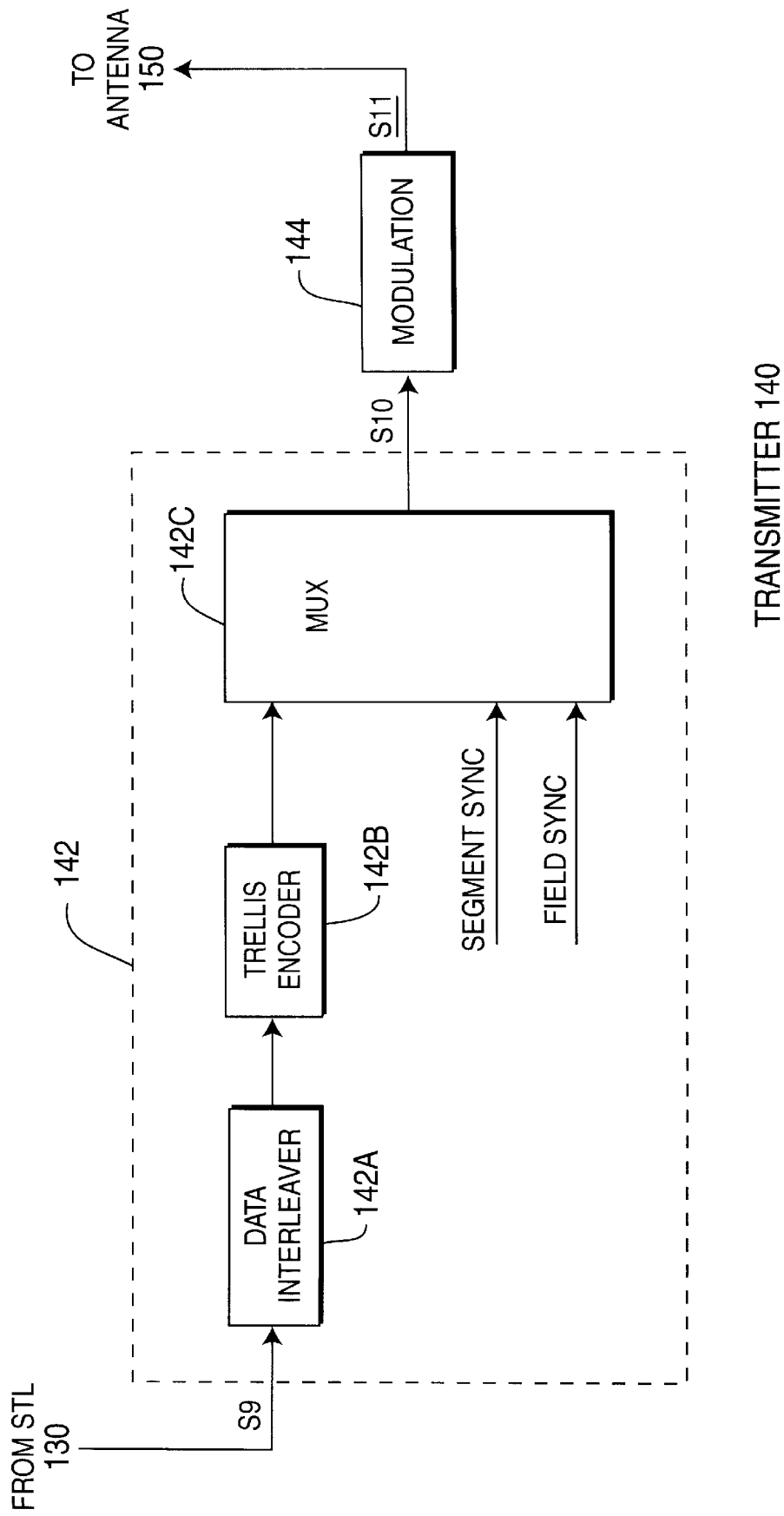
FIG. 3 shows a block diagram of a transmitter suitable for use in the television system of FIG. 1.

Referring to FIG. 3, a block diagram of a transmitter suitable for use in the television system of FIG. 1 is depicted. The selected, possibly error-corrected and processed data stream S9 is coupled to a channel coder 142. Ideally the processed data stream S9 comprises packets which were built, as previously described, using transport packets which contain the exact data required by the transmitter for generating field sync segments. The sync segments are the first segments in each of the two data fields which comprise a frame. As previously described, the data is organized as a series of data frames, each frame consisting of two fields, each field consisting of 313 segments, each segment consisting of 832 symbols. The amount of data represented by the 832 symbols in a data segment is equivalent to the 207 bytes (187 data bytes and 20 RS parity bytes) includes in a transport packet. However, due to data interleaving the actual data contained in a segment comes from several different transport packets.

Data interleaver 142A is, e.g., a known 52 segment and intersegment convolution byte interleaver, providing byte interleaving to a depth of about ⅙ data field, as defined in the ATSC A/53 specification. The interleaver 142A is synchronized to the first data byte of a data field and interleaves the data bytes of the packets in data stream S9.

Trellis encoder 142B is, e.g., a known ⅔ rate (R=⅔) trellis coder having an 8-level (3 bit) one-dimensional constellation, as defined in the ATSC A/53 specification. The Trellis encoder 142B encodes the interleaved data bytes into 8-level symbol data.

Multiplexer 142C receives the trellis coded symbol data and synchronizes this data with segment sync and field sync signals to produce a channel coded output data stream S10.

Modulation unit 144 modulates the channel coded output data stream S10 and any pilot signal onto an appropriate radio frequency (RF) carrier frequency (i.e., a selected NTSC 6 MHz channel) to produce a modulated RF output signal S11. RF output signal S11 is transmitted via terrestrial broadcast using antenna 150.

It is important to note that the previously-described processing steps of randomization, RS coding are normally used immediately prior to the steps of data interleaving and trellis encoding in an ATSC A/53 compliant television system. These processing steps are intended to help preserve the integrity of a transmitted data signal (terrestrial broadcast or high bandwidth modem). By separating the first two steps, the STL 130 is able to utilize required error correction techniques (to correct errors or characterize STL communication channels) prior to the transmission that requires such error correction techniques. This concept of multiple use of the error correction data may be expanded upon by also performing the interleave, trellis encoding and sync multiplexing functions in the encode processor 132 of the STL 130. A television system having an STL 130 thus modified would have several desirable attributes, including reduced transmitter cost and complexity, greater studio-side integration of equipment and processes, and greater studio-side control.

Although various embodiments which incorporate the teachings of the present invention have been shown and described in detail herein, those skilled in the art can readily devise many other varied embodiments that still incorporate these teachings.

What is claimed is:

1. In a communication system for delivering an information signal from a signal source to a signal transmitter via a first medium comprising a relatively low error communications channel, and transmitting said information signal from said signal transmitter to a receiver via a second medium comprising a relatively high error communications channel; a method of delivering said information signal to said transmitter comprising the following steps:

receiving said information signal from said signal source;

generating an error correction code, said error correction code being suited to said relatively high error communications channel;

including said error correction code in said information signal; and delivering said information signal including said error correction code to said signal transmitter via said first medium.

2. The method of claim 1 wherein said error correction code comprises a forward error correction (FEC) code.

3. The method of claim 2 wherein said including step further comprises the step randomizing said information signal prior to including said error code in said information signal.

4. The method of claim 1 wherein said step of delivering further comprises the step of determining if said information signal delivered via said first medium includes any errors.

5. The method of claim 1 wherein said step of delivering further comprises the steps of:

determining if said information signal delivered via said first medium includes any errors; and correcting said errors if said errors exceed a threshold level.

6. The method of claim 1 wherein said first medium comprises a plurality of parallel communication channels, each communication channel receiving said information signal from said signal source and delivering a respective information signal to said signal transmitter, and wherein said step of delivering further comprises the steps of:

determining, using said error correction code, if said respective information signals delivered via said first medium include errors; and coupling, to said transmitter, the respective information signal including the fewest number of errors.

7. The method of claim 6 wherein said step of delivering further comprises the step of coupling to said transmitter said information signal from said communication channel imparting the fewest number of errors.

8. The method of claim 6, wherein said step of determining comprises the step of counting, for a predetermined period of time, a number of errors for each communication channel.

9. The method of claim 1 wherein said first medium comprises at least three parallel communication channels, each communication channel receiving said information signal from said signal source and delivering a respective information signal to said signal transmitter, and wherein said step of delivering further comprises the steps of:

comparing said information signals from said respective communication channels; and coupling to said transmitter said information signal from a one of two communication channels having information signals which compare most favorably to each other.

10. The method of claim 9 wherein said comparing step comprises the step of comparing at least one of the following attributes of said information signals from said respective communication channels:

(A) a number of errors in an information signal;

(B) a byte by byte correlation between said information signals; and (C) a packet by packet correlation between said information signals.

11. The method of claim 1, wherein said relatively high error rate channel comprises a terrestrial broadcast channel.

12. The method of claim 1 wherein said first medium comprises a plurality of parallel communication channels, each communication channel receiving said information signal from said signal source and delivering a respective information signal to said signal transmitter, and wherein said step of delivering further comprises the steps of:

determining, for each of said communication channels, a level of quality; and coupling, to said transmitter, the information signal provided by the communication channel exhibiting the highest level of quality.

13. The method of claim 1 wherein said first medium comprises a plurality of parallel communication channels, each communication channel receiving said information signal from said signal source and delivering a respective information signal to said signal transmitter, and wherein said step of delivering further comprises the steps of:

determining, for each of said communication channels, a level of quality;

comparing said levels of quality associated with said communication channels to determine which sub-plurality of communications channels exhibit similar levels of quality; and coupling, to said transmitter, the information signal provided by the communication channel exhibiting the highest level of quality within the determined sub-plurality of information channels.

14. Apparatus for delivering an information signal from a signal source to a signal transmitter via a first medium comprising a relatively low error communications channel, said transmitter transmitting said information signal to a receiver via a second medium comprising a relatively high error communications channel, said apparatus comprising:

a receiver of said information signal from said signal source; and an error correction code generator for including an error correction code in said information signal, said error correction code being suited to said relatively high error communications channel;

said relatively low error communications channel delivering, to said transmitter, said information signal including said error correction code.

15. The apparatus of claim 14, wherein said error correction code further comprises a forward error correction (FEC) code.

16. The apparatus of claim 15, wherein said delivering channel randomizes said information signal prior to including said error code.

17. The apparatus of claim 14, further comprising:

error determining means for determining if said information signal delivered via said first medium includes any errors; and error correcting means for correcting said errors if said errors exceed a threshold level.

18. The apparatus of claim 14, wherein said first medium further comprises:

a plurality of parallel communication channels, each communication channel receiving said information signal from said signal source and delivering a respective information signal to said signal transmitter; and said apparatus further comprises:

error determining means for determining which of said plurality of parallel communication channels delivers a respective information signal having the fewest number of errors.

19. The apparatus of claim 18 wherein:

one of said parallel communication channels transmits said information signal having the fewest number of errors to said transmitter.

20. The apparatus of claim 14, wherein said first medium further comprises:

a plurality of communication channels, each communication channel receiving said information signal from said signal source and delivering a respective information signal to said signal transmitter; and said apparatus further comprises:

means for comparing said information signals from said respective communication channels and coupling to said transmitter said information signal from one of a plurality of communication channels having information signals which compare most favorably to each other.

21. The apparatus of claim 20, wherein said comparison utilizes at least one of the following attributes of said information signals from said respective communication channels:

(A) a number of errors in said respective information signals;

(B) a byte by byte correlation between said respective information signals; and (C) a packet by packet correlation between said respective information signals.

22. In a communication system for delivering an information signal from a signal source to a signal transmitter via a first medium, and transmitting said information signal from said signal transmitter to a receiver via a second medium; a method of delivering said information signal to said transmitter comprising the following steps:

receiving said information signal from said signal source;

generating an error correction code, said error correction code related to said second transmission medium;

including said error correction code in said information signal; and delivering said information signal including said error correction code to said signal transmitter via said first medium;

determining if said information signal delivered via said first medium includes any errors; and correcting said errors if said errors exceed a threshold level.

\* \* \* \* \*